(12) United States Patent
Juhola et al.

(10) Patent No.: US 9,817,243 B2
(45) Date of Patent: Nov. 14, 2017

(54) IMAGING APPARATUS (71) Applicant: Microsoft Technology Licensing, LLC, Redmond, WA (US)

(72) Inventors: Mikko Juhola, Salo (FI); Marko Eromäki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 14/606,565

(22) Filed: Jan. 27, 2015

(65) Prior Publication Data
US 2016/0216527 A1 Jul. 28, 2016

(51) Int. Cl.
*G02B 27/64* (2006.01)
*G02B 7/02* (2006.01)
*G02B 27/00* (2006.01)
*G03B 5/06* (2006.01)
*H04N 5/232* (2006.01)
*H04N 5/225* (2006.01)
(Continued)

(52) U.S. Cl.
CPC .......... *G02B 27/646* (2013.01); *G02B 7/023* (2013.01); *G02B 27/0025* (2013.01); *G03B 3/10* (2013.01); *G03B 5/06* (2013.01); *H04M 1/0264* (2013.01); *H04N 5/2254* (2013.01); *H04N 5/2257* (2013.01); *H04N 5/23248* (2013.01); *H04N 5/23287* (2013.01); *G02B 5/208* (2013.01); *G02B 13/003* (2013.01); *G03B 29/00* (2013.01); *G03B 2205/0007* (2013.01); *G03B 2205/0023* (2013.01)

(58) Field of Classification Search
CPC .. G02B 27/646; G02B 7/023; G02B 27/0025; G03B 5/06; G03B 13/36; H04M 1/0249; H04N 5/2254; H04N 5/2257; H04N 5/23248; H04N 5/23287
USPC .......................................... 359/557, 649, 648
See application file for complete search history.

(56) References Cited

U.S. PATENT DOCUMENTS 3,800,085 A * 3/1974 Ambats ................ H04N 5/7408
348/781
6,226,122 B1 5/2001 Sugawara
(Continued)

FOREIGN PATENT DOCUMENTS

WO 2013076350 A1 5/2013

OTHER PUBLICATIONS

"Nikon D3300 + AF-S DX Zoom-Nikkor 18-55mm f/3.5-5.6G ED II—Lens on camera in picture not included", Published on: Jun. 13, 2014, Available at: http://fotodiscountworld.co.za/page/16/?taxonomy=product_type&term=simple.
(Continued)

*Primary Examiner* — Bumsuk Won
*Assistant Examiner* — Grant Gagnon (57) ABSTRACT

The lens arrangement has at least two lenses, wherein a first lens may be used for autofocus and optical image stabilization. The first lens is tilted to compensate for the shaking movement of the hand-held device and to stabilize the image to be captured on the image plane. The tilt action may occur in two degrees of freedom, wherein an actuator causes the first lens to tilt around a pivot. A second lens is a field flattener lens that compensates for the error caused by the difference between the image plane and the focus plane. The field flattener lens causes the focal plane of the first lens to lie in the image plane when the first lens is in a tilted position.

20 Claims, 6 Drawing Sheets

(51) Int. Cl.
  *G03B 3/10* (2006.01)
  *H04M 1/02* (2006.01)
  *G02B 5/20* (2006.01)
  *G02B 13/00* (2006.01)
  *G03B 29/00* (2006.01)

(56) References Cited

U.S. PATENT DOCUMENTS

| | | |
|---|---|---|
| 6,567,126 B1 | 5/2003 | Slatter et al. |
| 7,907,174 B2 | 3/2011 | Stuckler |
| 8,000,568 B2 | 8/2011 | Presley et al. |
| 8,687,281 B2 | 4/2014 | Jannard et al. |
| 2008/0212154 A1 | 9/2008 | Feinsod et al. |
| 2012/0113318 A1 | 5/2012 | Galstian et al. |
| 2012/0307089 A1 | 12/2012 | Rukes |
| 2014/0211030 A1 | 7/2014 | Hideshima et al. |
| 2014/0340537 A1* | 11/2014 | Eromaki .......... G03B 5/06 348/208.8 |

OTHER PUBLICATIONS

"Images From Your Imagination, Delivered by Canon EF Lenses", Published on: Jun. 30, 2006, Available at: http://www.usa.canon.com/app/pdf/lens/EF_Lens_Bro.pdf.

"Our Lens Tilting Technology", Aug. 22, 2014, Available at: http://www.app-hk.com/index_topic.php?did=233604&didpath=/233551/233604.

"International Search Report and Written Opinion Issued in PCT Application No. PCT/US2016/013499", dated Aug. 4, 2016, 15 Pages.

"International Preliminary Report on Patentability Issued in PCT Application No. PCT/US2016/013499", dated Dec. 9, 2016, 6 Pages.

* cited by examiner

IMAGING APPARATUS

BACKGROUND

Digital cameras usually comprise a lens and a sensor for capturing an image by capturing light and converting it into electrical signals. Mobile electronic devices such as smart phones are usually equipped with an imaging apparatus, a camera. The imaging quality of the hand-held devices may be improved by optical image stabilization. A camera lens usually provides sharp focus on only a single plane. When the lens plane is tilted relative to the image plane, the focus plane is at an angle to the image plane, causing blurring near the edges of the image captured from the image plane.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The lens arrangement has at least two lenses, wherein a first lens may be used for autofocus and optical image stabilization. The first lens is tilted to compensate for the shaking movement of the hand-held device and to stabilize the image to be captured on the image plane. The tilt action may occur in two degrees of freedom, wherein an actuator causes the first lens to tilt around a pivot. A second lens is a field flattener lens that compensates for the error caused by the difference between the image plane and the focus plane. The field flattener lens causes the focal plane of the first lens to lie in the image plane when the first lens is in a tilted position.

Many of the attendant features will be more readily appreciated as they become better understood by reference to the following detailed description considered in connection with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a smartphone, the device described is provided as an example and not a limitation. As those skilled in the art will appreciate, the present examples are suitable for application in a variety of different types of mobile and/or hand-held apparatuses, e.g. in tablets, laptops or gaming consoles.

Figure 1:
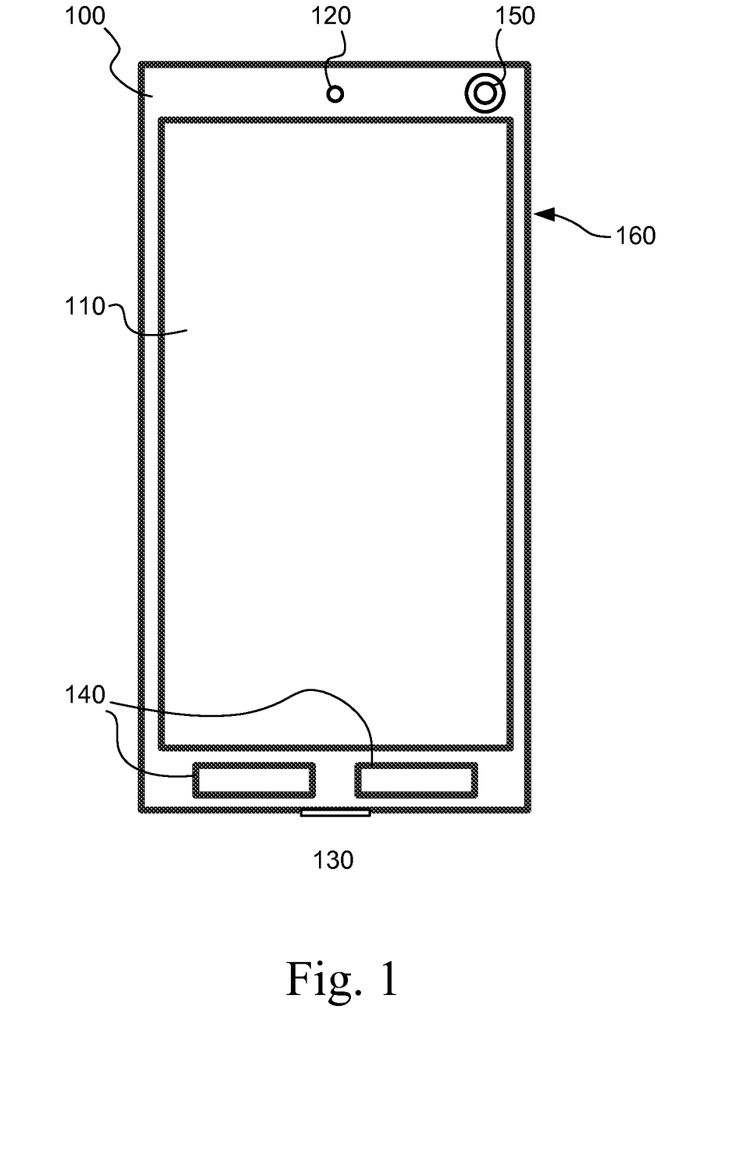
FIG. 1 is a schematic diagram of one example of an electronic device incorporating an imaging apparatus.

FIG. 1 shows one example of an electronic device incorporating an imaging apparatus, wherein one embodiment of the electronic device is a smartphone. The electronic device comprises a body 100 comprising a display 110, a speaker 120, a microphone 130 and keys 140. The electronic device comprises an imaging apparatus 150, a camera on one surface. The electronic device may comprise two or more cameras, for example one on the front surface 150 and one on the rear surface 160. Cameras may be different; some cameras may be equipped with optical image stabilization, whereas some cameras may lack certain features.

Figure 2:
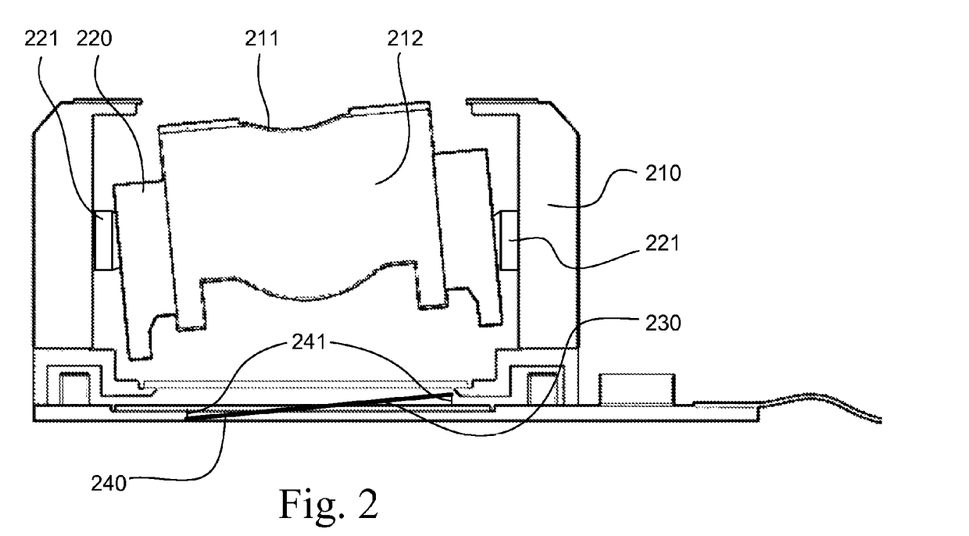
FIG. 2 is a schematic diagram of one example of an imaging apparatus having a first lens arranged on an optical axis.

FIG. 2 shows one example of an imaging apparatus 210 having a first lens 211 arranged on an optical axis. The optical axis is a line along which there is some degree of rotational symmetry in an optical system. The optical axis is an imaginary line that defines the path along which light propagates through the system. The first lens 211 is arranged in a lens barrel 220 as a part of a first lens group 212. The first lens group 212 inside the lens barrel 220 may operate an autofocus function, a zoom and the optical image stabilization. The optical image stabilization is achieved by tilting the lens barrel 220 in the direction that reduces the effect of detected shaking. The lens barrel 220 is attached to an actuator 221 that tilts the lens barrel. An image plane 230 is arranged on the optical axis to receive the image from the lens barrel 220. A focal plane 240 is the plane where object appears in focus. The tilted lens barrel 220 causes the focal plane 240 to tilt as well, wherein the focal plane 240 and the image plane are not aligned. The image plane 230 comprises for example a plurality of light sensing elements that measure the light captured by the light sensing elements to form an image of pixels. The focal plane projection error 241 increases towards the edges of the image plane and the edges of the image captured on the image plane 230 may be blurred.

Figure 3:
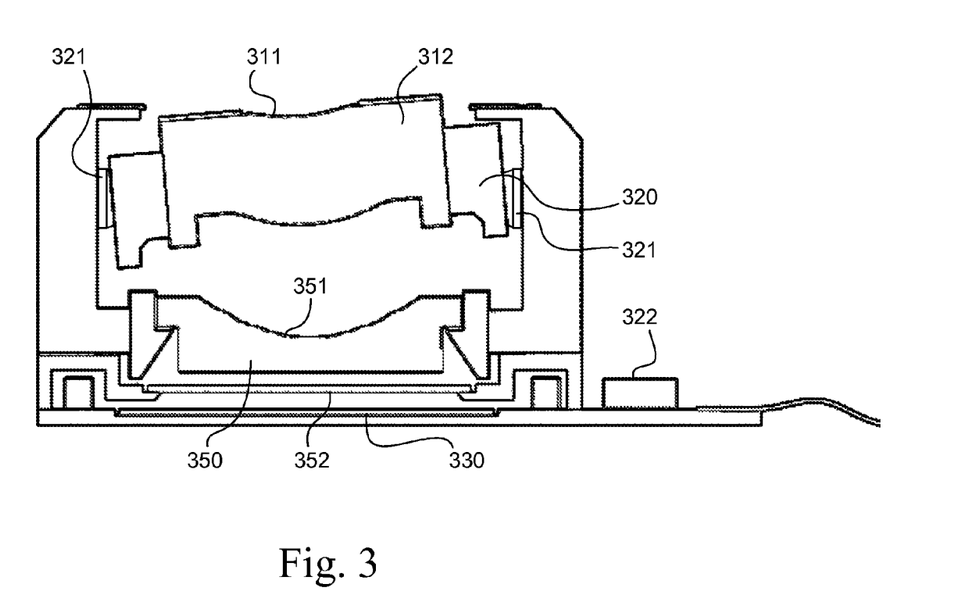
FIG. 3 is a schematic diagram of one example of an imaging apparatus having a first lens and a second lens arranged on an optical axis.

FIG. 3 discloses another example of an imaging apparatus. The first lens 311 is arranged on the lens barrel 320, wherein the cylindrical shape of the wall defines the cylindrical shape of the lens barrel 320. The first lens may also be arranged in other forms than the lens barrel 320. The first lens 311 may be part of a first lens group 312 arranged in the lens barrel, wherein all the lenses of the first lens group 312 tilt along with the lens barrel 320. In this example the autofocus or zoom function is achieved with the first lens group 312 in the lens barrel 320. An actuator 321 is attached to the first lens 311 or the lens barrel 320. The actuator 321 is configured to tilt the first lens 311 or the lens barrel. The lens barrel 320 may comprise one or more lenses to form a lens system. The actuator 321 receives information from the optical image stabilization element 322 that may comprise one or more orientation sensors such as gyroscope sensors, and the information is used as an input to counter the hand shaking. A computing based image detection system comparing at least two received images may be used to detect shaking movement in the imaging apparatus. The lens barrel 320 or the first lens 311 may be tilted to the direction opposite to the detected movement to counter the shaking—as an example, a corresponding stabilizing function appears in a human eye being focused to a single point that opposes the movement of the head. The optical image stabilization element 322 may be configured as a separate element 322 comprising a computing based device or at least portion of the functions may be embedded to the actuator 321. The optical image stabilization element 322 is connected to the actuator 321, wherein an electric signal may travel between the image stabilization element 322 and the actuator 321. The actuator 321 causes the first lens 311 to tilt in response to the optical image stabilization element 322. An image plane 330 is arranged on the optical axis for capturing the image for example with an image sensor. The image plane 330 comprises for example a plurality of light sensing elements that measure the light captured by the light sensing elements to form an image of pixels. Examples of the image plane comprise image sensor element, a device that converts an optical image into an electronic signal or an image capturing device. A second lens 350 is positioned on the optical axis between the first lens 311 and the image plane 330. The second lens comprises a field flattener lens 351.

In one embodiment the imaging apparatus comprises a first lens 311 on an optical axis; an actuator 321 coupled to the first lens 311, configured to cause the first lens 311 to tilt in response to an optical image stabilization element 322; an image plane 330 on the optical axis; and a second lens 350 comprising a field flattener lens 351, on the optical axis between the first lens 311 and the image plane 330. In one embodiment the second lens 350 comprises an infrared filter 352. The infrared filter reduces the color shading. A further effect of the reduced color shading is a less distorted image. The second lens 350 may be a concave lens, a double concave lens and/or it may comprise a prism structure.

In one embodiment the second lens 350 is immovably connected to the imaging apparatus. The field flattener lens 351 does not tilt with the first lens 311 or with the first lens group 312; it is arranged to flatten the focal plane to the image plane 330 at all predefined tilt angles of the first lens 311 or the lens barrel 320. The effect is achieved by designing the flattener lens rather than moving the image plane, image sensor or by moving another element to counteract the tilted first lens 311 or the first lens group 312. In one embodiment the second lens 320 is configured to cause the focal point of the first lens 311 or the first lens group 312 to lie in the image plane when the first lens 311 or the first lens group 312 is in a tilted position. The field flattener lens flattens the field curvature of the first lens group 312, wherein the curve is defined by series of points caused by varying tilting angle. The shape of the field flattener lens 351 may be calculated or by selecting an appropriate field flattener lens from several alternatives that allows flattening of the focal point or the focal plane to the image plane when the first lens 311 or the first lens group is in the tilted position. In one embodiment the appropriate flattening lens 351 is selected with the trial and error method.

One embodiment comprises a point around which the first lens 311 is tilted, and the series of focal points of the first lens 311 correspond to a focal curve according to the tilting angle, wherein the second lens 350 flattens the focal curve to the image plane 330. One embodiment comprises the actuator 321 configured to allow tilting of the first lens 311 around a pivot, and the series of focal points of the first lens 311 correspond to a focal curve according to the tilting angle around the pivot, wherein the second lens 350 flattens the focal curve to the image plane. The point around which the first lens 311 tilts may be virtual or reference information for the imaging apparatus, as the actuator 321 may tilt the first lens 311 or the lens barrel 320 suspending it from side walls. Said point may be located on the optical axis. The suspended lens barrel 320 may be tilted around the point, wherein the actuator 321 defines the point around which the first lens 311 is tilted. Without the flattening lens 351 the series of focal points of the first lens 311 or the first lens group 312 form an arc of a fixed radius, wherein the point around which the first lens 311 is tilted forms a center point. The center point may be called the pivot. The pivot is used to arrange the autofocus and zoom with the first lens group 312 in the lens barrel 320. The pivot of the lens barrel 320 may be used as a fixed reference, wherein the autofocus of the lens barrel 320 is used to move the first lens group 312 further or closer to the image plane 330. In an embodiment the point around which the first lens 311 is tilted may be tracked by the actuator 321 and the lens barrel 320, wherein the actuator 321 moves lens barrel 320 along the optical axis and the lens barrel moves the lenses configured in the lens barrel 320. In an embodiment the first activator for the lens barrel 320 movement is the optical image stabilization and the second activator is the autofocus. The optical image stabilization element 322 may cause the activation and send the signal to control the movement. As the autofocus may displace the pivot, the first lens group 312 is moved accordingly in relation to the pivot to compensate difference between the pivot and the autofocus. The imaging device is provided with a computing-based device to correct the pivot after the autofocus function.

Figure 4:
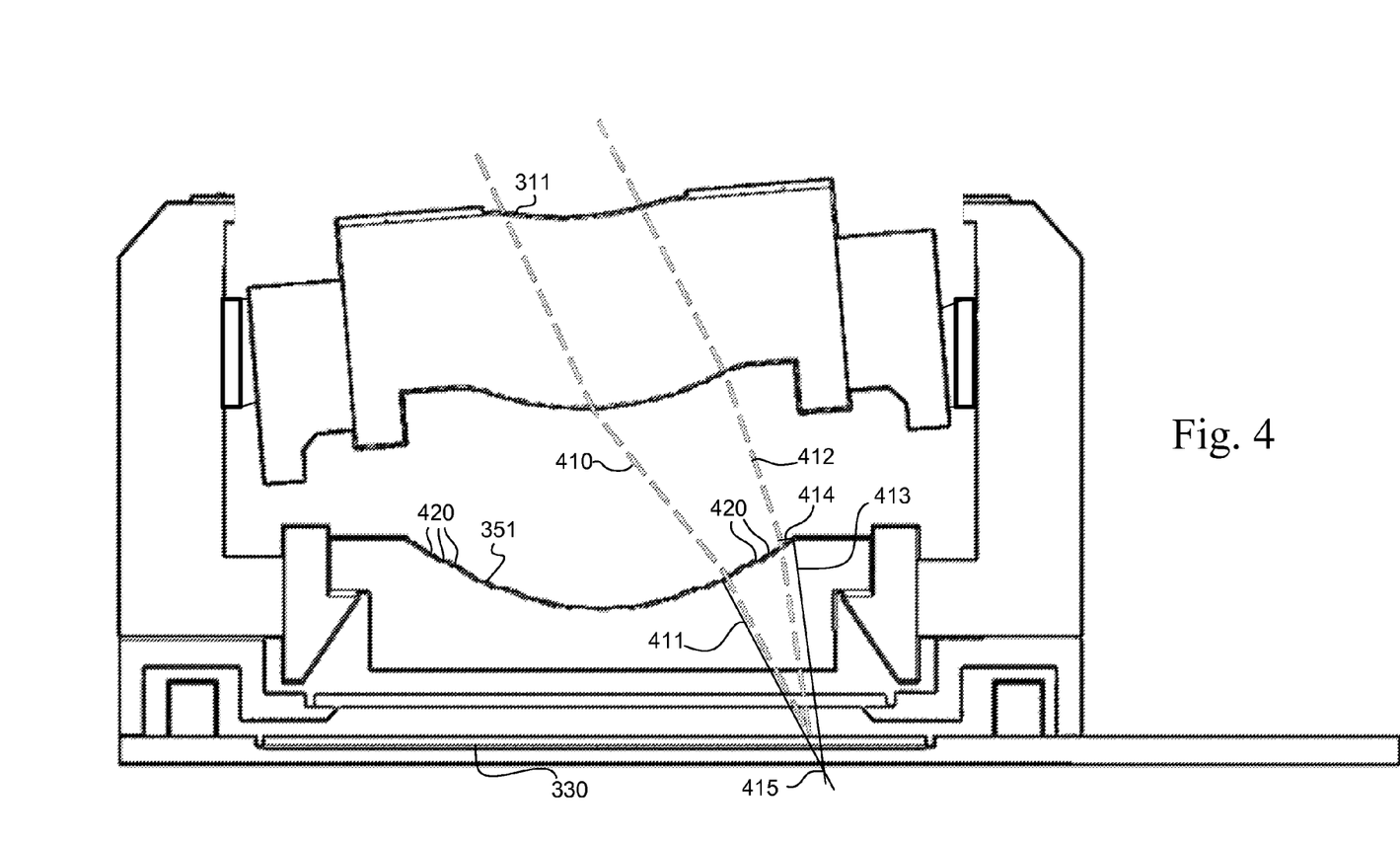
FIG. 4 is a schematic diagram illustrating the effect of a prism in tilted position.

In one embodiment the first lens 311 is arranged in a lens barrel 320. In one embodiment the second lens 350 comprises a single lens 351. In one embodiment the field flattener lens 351 comprises a prism 420 near the edges to compensate for the aberration caused by the tilted angle towards the second lens 350. As seen from FIG. 4, the shape of the first lens 311 is tilted and the light rays travel to a different distance through the field flattener lens 351. As an example, without the prism 420 the left light ray 410, dashed line, travels on a path 411, solid line, in the field flattener lens 351. The right light ray 412, dashed line, travels a substantially longer distance on a path 413, solid line, through the field flattener lens 351 and moves the light ray 413 further to the right 414, solid line, causing aberration to the image as the focus point 415 is below the image plane. Without the prism 420, this would cause the focal plane and the image plane to separate when applying the extreme tilt angles. According to the embodiment the prism 420 arranged to the field flattener lens 351 causes the distances traveled by the light rays in the field flattener lens 351 to be evened out during the extreme tilt angles, as illustrated by the dashed line with the focal point on the image plane. A Petzval field curvature describes the optical aberration in which a flat object cannot be brought into focus on a flat image plane. In one embodiment the first lens 311 is configured to flatten the Petzval field curvature to the image plane and the second lens 350 is configured to flatten to the image plane 330 the curvature caused by the tilted first lens 311. In one embodiment the first lens 311 and the second lens 350 are configured to flatten the Petzval field curvature to the image plane 330. In one embodiment the second lens 350 is arranged to flatten the Petzval field curvature to the image plane 351.

Figure 5A:
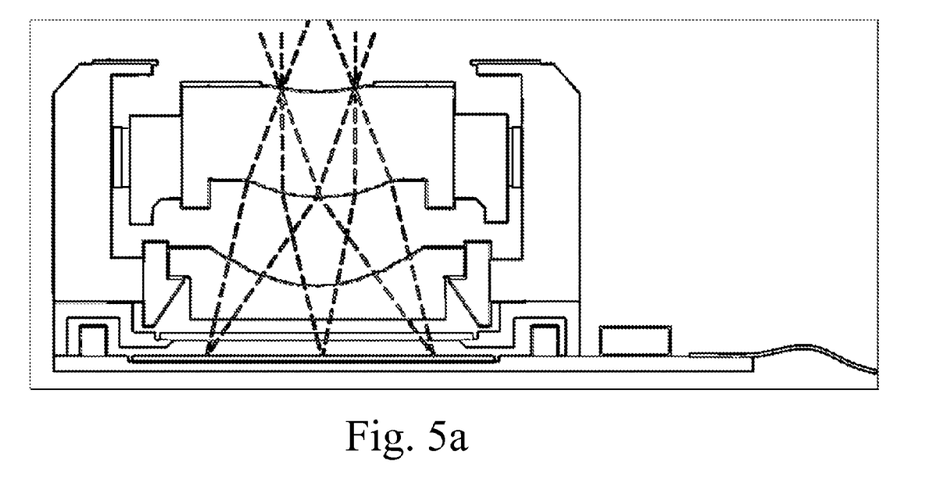
FIG. 5a illustrates an exemplary scenario of tilt-enabled optical image stabilization with two lens groups.
Figure 5B:
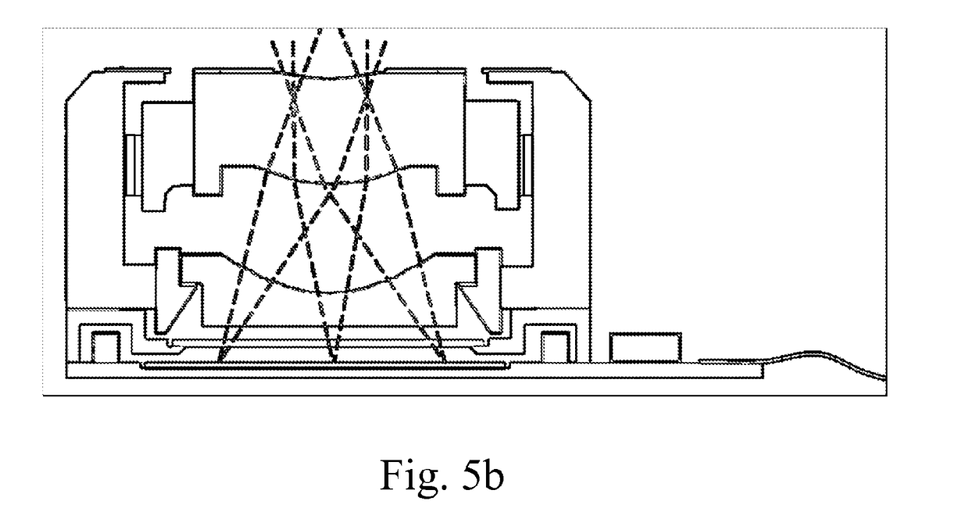
FIG. 5b illustrates an exemplary scenario of tilt-enabled optical image stabilization with two lens groups.
Figure 5C:
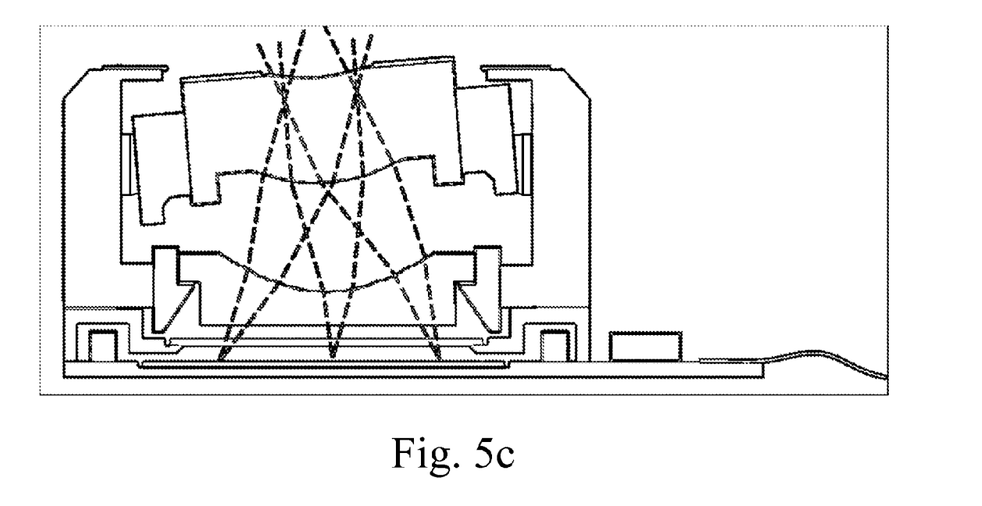
FIG. 5c illustrates an exemplary scenario of tilt-enabled optical image stabilization with two lens groups.
Figure 5D:
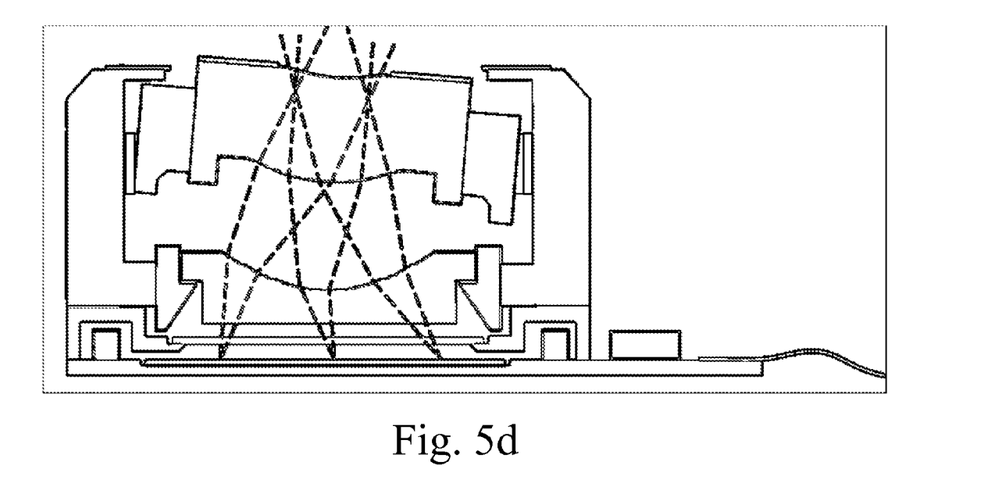
FIG. 5d illustrates an exemplary scenario of tilt-enabled optical image stabilization with two lens groups.
Figure 5E:
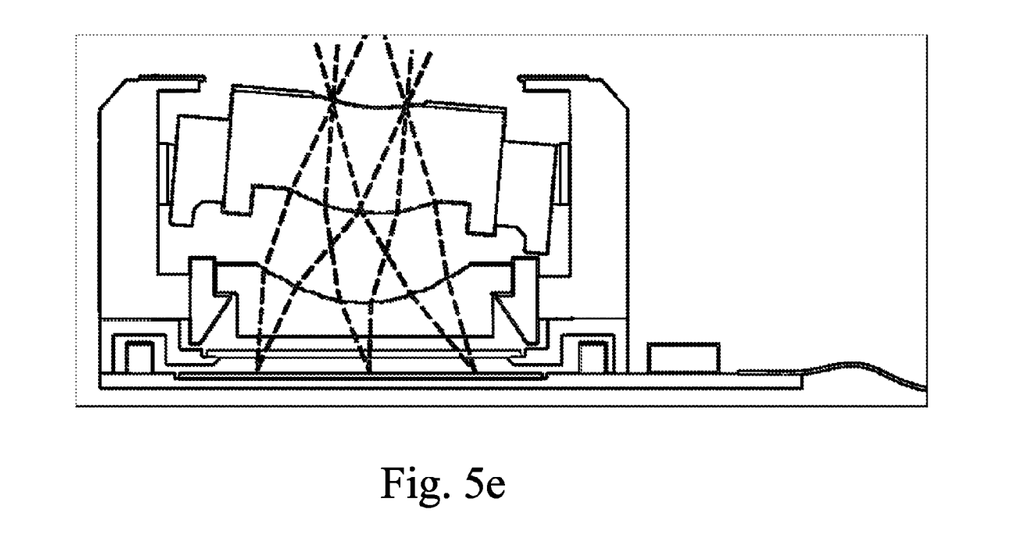
FIG. 5e illustrates an exemplary scenario of tilt-enabled optical image stabilization with two lens groups.
Figure 5F:
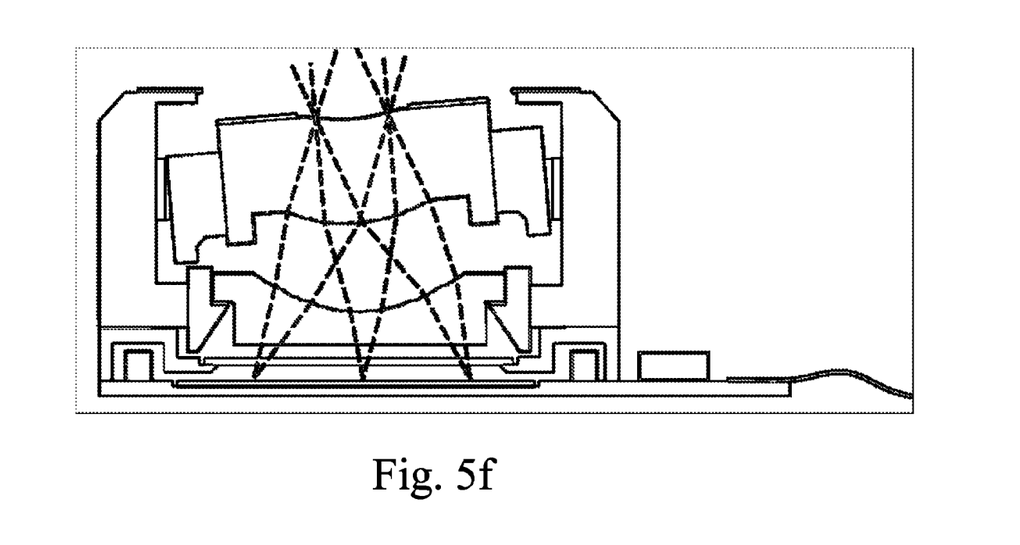
FIG. 5f illustrates an exemplary scenario of tilt-enabled optical image stabilization with two lens groups.

FIGS. 5a-5f illustrate exemplary scenarios of tilt-enabled optical image stabilization with two lens groups. Light rays are illustrated as dashed lines and the diffraction points are illustrated at lens edges. FIG. 5a shows a case, where the first lens group is not tilted and the movable first lens group is focused to infinity. The focal plane is equivalent to the image plane. Similarly in the case of FIG. 5b the first lens group is not tilted. The first lens group is focused to macro and the focal plane matches the image plane. FIG. 5c shows the first lens group tilted to the left when focused to macro and the optical image stabilizer is activated. The second lens corrects the image alignment to the image plane, maintaining focus by significantly reducing blurring. FIG. 5d shows the first lens group tilted to the right when focused to macro and the optical image stabilizer is activated. As in the previous example, the second lens corrects the image alignment to the image plane, maintaining focus by significantly reducing blurring. FIG. 5e shows the first lens group tilted to the right, focused at infinity and the optical image stabilization activated. The second lens corrects the image alignment to the image plane, maintaining focus by significantly reducing blurring. FIG. 5f shows the first lens group tilted to the left, focused at infinity and the optical image stabilization activated. The second lens corrects the image alignment to the image plane, maintaining focus by significantly reducing blurring. The optical image stabilization is used more effectively when focused to infinity, in one embodiment the optical image stabilization is disabled for the macro imaging.

One embodiment discloses an electronic device incorporating an imaging apparatus, the imaging apparatus comprising a first lens on an optical axis; an actuator coupled to the first lens, configured to cause the first lens to tilt in response to an optical image stabilization element; an image plane on the optical axis; and a second lens comprising a field flattener lens on the optical axis between the first lens and the image plane. In an embodiment of the electronic device the second lens is immovably connected to the imaging apparatus. In an embodiment of the electronic device the second lens is configured to cause the focal point of the first lens to lie in the image plane when the first lens is in a tilted position. In an embodiment of the electronic device the actuator is configured to allow tilting of the first lens around a pivot, and the series of focal points of the first lens correspond to a focal curve according to the tilting angle around the pivot, wherein the second lens flattens the focal curve to the image plane. In an embodiment of the electronic device the first lens is in a lens barrel. In an embodiment of the electronic device the second lens comprises a single lens. In an embodiment of the electronic device the second lens comprises an infrared filter.

One embodiment discloses a system, comprising an imaging apparatus; an optical image stabilization element; a processor and a memory storing instructions that, when executed, control the operation of the optical image stabilization element; a first lens on an optical axis; an actuator coupled to the first lens, configured to cause the first lens to tilt for at least two degrees of freedom, in response to a signal received from the optical image stabilization element; an image plane on the optical axis; and a second lens on the optical axis between the first lens and the image plane, wherein the second lens is configured to cause the focal point of the first lens to lie in the image plane when the first lens is in a tilted position. In an embodiment of the system the second lens is immovably connected to the imaging apparatus. In an embodiment of the system the actuator is configured to allow tilting of the first lens around a pivot, and the series of focal points of the first lens correspond to a focal curve according to the tilting angle around the pivot, wherein the second lens flattens the focal curve to the image plane. In an embodiment of the system the first lens is in a lens barrel. In an embodiment of the system the second lens comprises a single lens. In an embodiment of the system the second lens comprises an infrared filter.

One embodiment discloses an optical image stabilizer for an imaging apparatus, the imaging apparatus comprising a first lens, a lens barrel and an image plane. The optical image stabilizer comprises a shake detector element and an actuator that causes the lens barrel to tilt in response to a shake detected by the shake detector element; and a second lens comprising a field flattener lens, arranged on the optical axis between the first lens and the image plane. The field flattener lens flattens the focal plane of the tilted first lens to the image plane.

One embodiment discloses a method, comprising performing optical image stabilization by tilting a first lens or a first lens group, and arranging a second lens comprising a field flattener lens on the optical axis between the lens barrel and the focal plane, wherein the field flattener lens reduces the focus error caused by the tilted lens barrel. One embodiment discloses a method for optical image stabilization on an imaging apparatus, comprising a first lens or a first lens group arranged on an optical axis; an actuator coupled to the first lens or the first lens group, causing the first lens or the first lens group to tilt in response to an optical image stabilization element; an image plane arranged on the optical axis; and a second lens comprising a field flattener lens, arranged on the optical axis between the first lens or the first lens group and the image plane. One embodiment discloses a method for optical image stabilization on an imaging apparatus, comprising a first lens or a first lens group arranged on an optical axis; means for tilting the first lens or the first lens group in response to an optical image stabilization information; an image plane arranged on the optical axis; and a second lens comprising a field flattener lens, arranged on the optical axis between the first lens or the first lens group and the image plane.

The tilt-enabled optical image stabilization allows for the imaging apparatus several degrees of shake that can still be corrected. The functionality can be used to improve panorama imaging, where the camera takes several images and combines them into one single wide image. Tilt-enabled optical image stabilization may be used even in macro imaging, where most image stabilizing techniques are ineffective. In an embodiment the extreme tilt angles are 3 degrees from the center position; in another embodiment the extreme tilt angles are 1.5 degrees from the center position.

Alternatively, or in addition, the functionality described herein can be performed, at least in part, by one or more hardware components or hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the optical image stabilization element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not only include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An imaging apparatus, comprising:
   a first lens on an optical axis;
   an actuator coupled to the first lens, the actuator configured to cause the first lens to tilt in one of a plurality of predefined tilt angles in response to an optical image stabilization element;
   an image plane on the optical axis; and
   a second lens comprising a field flattener lens on the optical axis between the first lens and the image plane, the field flattener arranged to flatten a focal plane to the image plane at each of the plurality of predefined tilt angles.

2. An imaging apparatus according to claim 1, wherein the second lens is immovably connected to the imaging apparatus.

3. An imaging apparatus according to claim 1, wherein the second lens is configured to cause the focal point of the first lens to lie in the image plane when the first lens is in a tilted position.

4. An imaging apparatus according to claim 1, wherein the actuator is configured to allow tilting of the first lens around a pivot, and the series of focal points of the first lens correspond to the focal curve according to the tilting angle around the pivot.

5. An imaging apparatus according to claim 1, wherein the first lens is in a lens barrel.

6. An imaging apparatus according to claim 1, wherein the second lens comprises a single lens.

7. An imaging apparatus according to claim 1, wherein the second lens comprises an infrared filter.

8. An electronic device incorporating an imaging apparatus, the imaging apparatus comprising:
   a first lens on an optical axis;
   an actuator coupled to the first lens, the actuator configured to cause the first lens to tilt in one of a plurality of predefined tilt angles in response to an optical image stabilization element;
   an image plane on the optical axis; and
   a second lens comprising a field flattener lens on the optical axis between the first lens and the image plane, the field flattener arranged to flatten a focal plane to the image plane at each of the plurality of predefined tilt angles.

9. An electronic device according to claim 8, wherein the second lens is immovably connected to the imaging apparatus.

10. An electronic device according to claim 8, wherein the second lens is configured to cause the focal point of the first lens to lie in the image plane when the first lens is in a tilted position.

11. An electronic device according to claim 8, wherein the actuator is configured to allow tilting of the first lens around a pivot, and the series of focal points of the first lens correspond to the focal curve according to the tilting angle around the pivot.

12. An electronic device according to claim 8, wherein the first lens is in a lens barrel.

13. An electronic device according to claim 8, wherein the second lens comprises a single lens.

14. An electronic device according to claim 8, wherein the second lens comprises an infrared filter.

15. A system, comprising:
    an imaging apparatus;
    an optical image stabilization element;
    a processor;
    a memory storing instructions that, when executed by the processor, control the operation of the optical image stabilization element;
    a first lens on an optical axis;
    an actuator coupled to the first lens, the actuator configured to cause the first lens to tilt in one of a plurality of predefined tilt angles in response to a signal received from the optical image stabilization element;
    an image plane on the optical axis; and
    a second lens on the optical axis between the first lens and the image plane, wherein the second lens is configured to cause the focal point of the first lens to lie in the image plane when the first lens is in each of the plurality of predefined tilt angles.

16. A system according to claim 15, wherein the second lens is immovably connected to the imaging apparatus.

17. A system according to claim 15, wherein the actuator is configured to allow tilting of the first lens around a pivot, and the series of focal points of the first lens correspond to a focal curve according to the tilting angle around the pivot, wherein the second lens flattens the focal curve to the image plane.

18. A system according to claim 15, wherein the first lens is in a lens barrel.

19. A system according to claim 15, wherein the second lens comprises a single lens.

20. A system according to claim 15, wherein the second lens comprises an infrared filter.

* * * * *